Nov. 23, 1926.

I. M. PEASE

SCREW PAD

Filed June 12, 1926

1,608,335

Isaac M. Pease
Inventor

By [signature]
Attorneys

Patented Nov. 23, 1926.

1,608,335

UNITED STATES PATENT OFFICE.

ISAAC M. PEASE, OF CINCINNATI, OHIO.

SCREW PAD.

Application filed June 12, 1926. Serial No. 115,522.

This invention aims to provide a novel connection between the truss spring of a truss and the truss pad.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
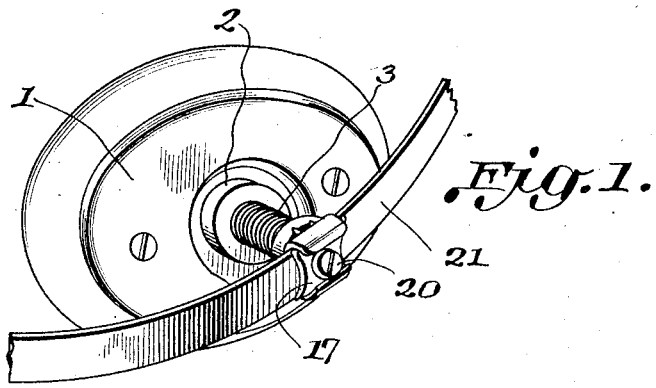
Figure 1 shows in perspective, a device constructed in accordance with the invention.

The numeral 1 marks a truss pad having a boss 2, a post 3 being threaded for adjustment into the boss 2, and being held in adjusted positions, by a set screw 4 which is threaded into the boss 2, the inner end of the screw bearing on the post 3. The post 3 has an enlarged head 5 provided with a rim 6 prolonged parallel to the axis of the post, the rim 6 having radial seats 7, the head 5 and the post 3 being provided with an opening 8.

Figure 4:
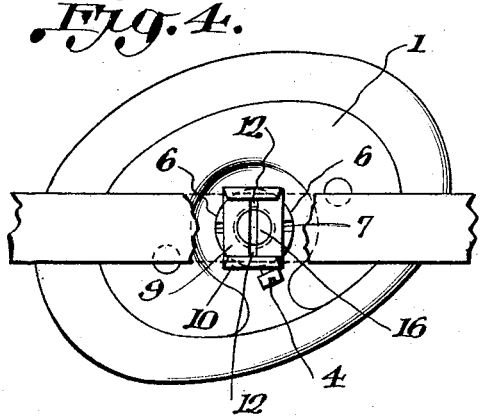
Figure 4 is a plan, parts being broken away, parts being removed, and the pad having been adjusted.
Figure 5:
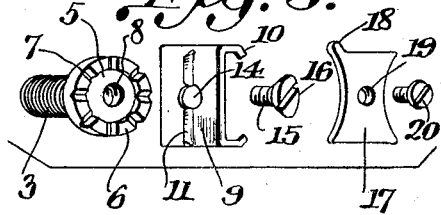
Figure 5 is a composite view showing the fastening and adjusting elements in perspective.

A U-shaped saddle 9 is supplied and the side walls of the saddle have overhanging flanges 10. The base of the saddle 9 rests against the rim 6 on the head 5 of the post 3, and the base of the saddle has an opening 14 which registers with the opening 8 in the post. On each side of the opening 14, the constituent material in the base of the saddle 9 is distorted to form ribs 11 on the inner surface of the base of the saddle, and to form kerfs 12 on the outer surface of the base of the saddle. The ribs 11 are adapted to be received in the seats 7 that are formed in the rim 6 of the head 5 of the post. A screw 15 passes through the opening 14 of the saddle 9 and is threaded into the opening 8 of the post 3, the screw 15 serving to keep the ribs 11 engaged with the seats 7, the screw 15 being supplied with a kerf 16 which, as shown in Figure 4, is alined with the kerfs 12 of the saddle 9 when the screw 15 is advanced to bind the ribs 11 tightly and securely in the seats 7 of the rim 6 in the head 5 of the post 3.

A body-encircling member, such as a truss spring 21, extends slidably beneath the overhanging flanges 10 of the saddle 9. A thrust plate 17 is interposed between the flanges 10 and the truss spring 21, the thrust plate 17 being equipped at one corner with a finger 18 which stops the thrust plate 17 and prevents the thrust plate from sliding in one direction out from beneath the flanges 10. The thrust plate 17 has an opening 19 into which is threaded a screw 20 adapted to bear on the truss spring 21 and to push the thrust plate 17 outwardly and bind the thrust plate against the flanges 10 of the saddle 9.

Figure 2:
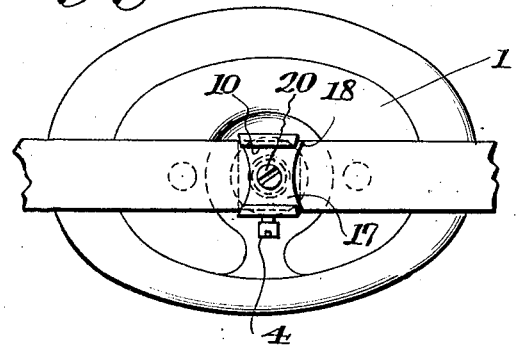
Figure 2 is a plan.
Figure 3:
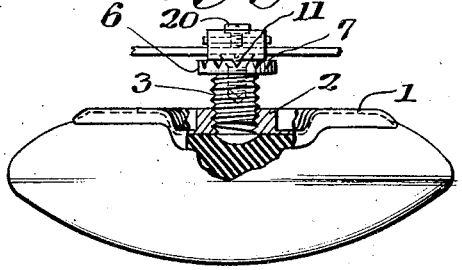
Figure 3 is a side elevation wherein parts are in section.

Suppose that the thrust plate 17 and the screw 20 have been removed, that the truss spring 21 has been detached, and that the set screw 4 has been loosened. Suppose, also, that it is desired to adjust the post 3 inwardly or outwardly. Then, a screw driver can be engaged simultaneously in the kerfs 12 of the saddle 9 and in the kerf 16 of the screw 15, to turn both the saddle 9 and the post 3, the post 3 being threaded inwardly or outwardly in the boss 2, for adjustment. It is to be observed that whilst the post 3 is being rotated as and for the purpose specified, the screw driver is engaged in the kerf 16 of the screw 15 and the screw is held so that the screw will not rotate and loosen. If a smaller screw driver is used, the screw 16 may be loosened, and, then, the ribs 11 may be disengaged from the seats 7, it being possible to shift the pad from the position shown in Figure 2 to another position, for instance, the position shown in Figure 4. When the screws 4 and 16 have been tightened up, the spring 21 may be mounted beneath the flanges 10, the plate 17 may be introduced between the spring 21 and the flanges 10, and, finally, the screw 20 may be threaded into the opening 19 of the plate 17, to press the plate 17 outwardly against the flanges 10, the inner end of the screw 20 bearing on the spring 21 to prevent the spring 21 from shifting in the direction of its length. It is to be observed that one operation, to wit, the adjustment of the base of the saddle 9, serves to fashion the ribs 11 and the kerfs 12.

What is claimed is:—

1. In a device of the class described, a truss pad, a post threaded for adjustment into the pad and provided with a seat, a saddle on the end of the post, and a screw connecting the saddle with the post, and having a kerf, the constituent material of the saddle being distorted to form a rib on the inner surface of the saddle and engaged in the seat, and to form a kerf on the outer surface of the saddle, and alined with the kerf of the screw, a body-engaging member, and means for holding the body-engaging member on the saddle.

2. In a device of the class described, a truss pad, a post threaded for adjustment into the pad and provided with a seat, a saddle on the end of the post and supplied with overhanging flanges, a screw connecting the saddle with the post and having a kerf, the constituent material of the saddle being distorted to form a rib on the inner surface of the saddle and engaged in the seat, and to form a kerf on the outer surface of the saddle and alined with the kerf of the screw, a body-engaging member extended beneath the flanges of the saddle, a thrust plate beneath the flanges, and a screw threaded into the thrust plate and bearing on the body-engaging member.

In testimony that I claim the foregoing as my own, I have hereto affixed my signature.

ISAAC M. PEASE.